United States Patent [19]

Good et al.

[11] Patent Number: 5,697,985
[45] Date of Patent: Dec. 16, 1997

[54] PROCESS FOR THE PREPARATION STORAGE-STABLE DYE DISPERSIONS

[75] Inventors: James J. Good, Charleston; Tanya T. Harper, Goose Creek, both of S.C.; Samuel S. Murphree, Leverkusen, Germany; John G. Skabardonis, Mount Vernon, Ind.

[73] Assignee: Bayer Corporation, Pittsburgh, Pa.

[21] Appl. No.: 647,715

[22] Filed: May 24, 1996

Related U.S. Application Data

[63] Continuation-in-part of Ser. No. 485,565, Jun. 7, 1995, abandoned.

[51] Int. Cl.$^6$ .................................................. C09B 67/00
[52] U.S. Cl. ..................... 8/528; 8/681; 8/684; 8/687; 8/690; 8/561; 534/581; 534/582; 534/584
[58] Field of Search ............................. 8/527, 528, 561, 8/681–684, 687, 690; 534/581, 582, 584

[56] References Cited

U.S. PATENT DOCUMENTS

| | | | |
|---|---|---|---|
| 913,634 | 2/1909 | Fourneaux | 8/585 |
| 1,127,027 | 2/1915 | Kunert et al. | 8/667 |
| 1,719,944 | 7/1929 | Risse et al. | 8/562 |
| 4,002,603 | 1/1977 | Robbins et al. | 534/716 |
| 4,468,230 | 8/1984 | Thomas et al. | 8/528 |
| 4,545,818 | 10/1985 | Inoue et al. | 106/22 |
| 4,671,691 | 6/1987 | Case et al. | 401/142 |
| 4,673,410 | 6/1987 | Sandefur et al. | 8/528 |
| 4,726,845 | 2/1988 | Thompson et al. | 106/25 |
| 5,076,968 | 12/1991 | Fringeli et al. | 252/543 |

OTHER PUBLICATIONS

"Direct Dyes" in Colour Index, Third Edition vol. 2 (The Society of Dyers and Colourists 1971) (Month Unavailable) 2005–2006.

H. Zollinger, Color Chemistry (VCH Verlagsgessellschaft, 1973), (Month unavailable) pp. 163–167.

H.E. Woodward, "Azo Dyes for Cotton" in the Chemistry of Synthetic Dyes and Pigments, ed. H.S. Lubs (Robert E. Krieger Publishing Company, 1955) (Month unavailable) pp. 111–143.

*Primary Examiner*—Margaret Einsmann
*Attorney, Agent, or Firm*—Joseph C. Gil; Richard E. L. Henderson

[57] ABSTRACT

This invention relates to a process for the preparation of storage-stable dye dispersions of alkali metal salts of anionic azo direct dyes by (a) preparing an aqueous slurry of an alkali metal salt of an azo direct dye, said salt having a solubility in water at 25° C. of about 0.1 to about 15% by weight, by azo coupling one or more aromatic diazonium salts with one or more couplers while maintaining a pH of at least about 5 by adding a basic alkali metal compound in the absence of a nitrogen-containing base;

(b) optionally, stirring the aqueous slurry at a temperature of about 5° C. to about 100° C. for up to about six hours;

(c) optionally, adjusting the temperature of the aqueous slurry to about 5° C. to about 40° C.; and (d) adding to the aqueous slurm/a viscosity enhancing agent in an amount sufficient to obtain a viscosity, determined at a temperature of about 20° to about 25° C., of about 500 to about 5000 centipoise (preferably 800 to 1500 centipoise) and 0 to about 10% by weight, based on the total weight of the dye dispersion, of a humectant.

14 Claims, No Drawings

PROCESS FOR THE PREPARATION STORAGE-STABLE DYE DISPERSIONS

This application is a Continuation-In-Part of application Ser. No. 08/485,565 filed Jun. 7, 1995, now abandoned.

BACKGROUND OF THE INVENTION

This invention relates to the direct preparation of storage-stable dye dispersions based on alkali metal salts of azo direct dyes stabilized by viscosity enhancing agents.

To direct dyes are known. For example, "Direct Dyes" in *Colour Index*, Third Edition, Vol. 2 (The Society of Dyers and Colourists, 1971), pages 2005–2006; H. Zollinger, *Color Chemistry (VCH Vedagsgessellschaft,* 1973), pages 163–167; and H. E. Woodward, "Azo Dyes for Cotton" in *The Chemistry of Synthetic Dyes and Pigments*, ed. H. A. Lubs (Robert E. Krieger Publishing Company, 1955), pages 111–143. Azo direct dyes are anionic dyes that contain one or more azo groups and are, by definition, substantive to cellulose when applied from an aqueous bath containing an electrolyte (e.g., *Colour Index* at page 2005), although some direct dyes can also be used for dyeing or printing leather, wool, silk, nylon, and bast fibers. When azo direct dyes are used as dilute aqueous solutions, the counterion is generally not critical. However, when such dyes are prepared as concentrated aqueous solutions, it is usually necessary to use amine-based counterions (rather than metal ions) and solubilizing agents such as urea to obtain stable solutions of such dyes. Therefore, for economic and environmental reasons, it would be advantageous to avoid using the dyes as amine-based salts.

Although metal salts of anionic dyes are generally unsuitable for the preparation of concentrated solutions, methods for using metal salts are known. For example, dyes can be formed or color-developed directly on the fiber, thereby avoiding solubility problems. E.g., U.S. Pat. Nos. 913,634 and 1,127,027. However, such methods are not suited to the preparation of concentrated storage-stable dye dispersions. It is also possible to stabilize dispersions of metal salts of anionic dyes with viscosity enhancing agents, including anionic polysaccharides such as xanthan gum. E.g., U.S. Pat. Nos. 1,719,944, 4,002,603, 4,468,230, 4,545,818, 4,671, 691, 4,673,410, 4,726,845, and 5,076,968. However, dispersions are typically prepared by first isolating the metal salt and only then suspending the metal salt in a suitable aqueous medium containing one or more stabilizing additives. Although U.S. Pat. No. 1,719,944 discloses the addition of alkyl cellulose at various stages during the preparation of low-solubility dyes, including addition immediately after such dyes are formed, the resultant dyes are collected as pastes or solids rather than obtained as stable dispersions.

Therefore, it was an object of the present invention to obtain stable dispersions of metal salts of azo direct dyes that can be prepared without using intermediate isolation steps and used without using special dyeing methods.

It has now been found possible to obtain high quality storage-stable dispersions of alkali metal salts of anionic azo direct dyes by adding a viscosity enhancing agent directly to the reaction mixture in which the dye is formed without first isolating the dye. Despite the absence of an isolation step, dispersions prepared according to the present invention, which do not precipitate on standing, even for extended periods, can typically be used as direct replacements of the corresponding amine-based liquid formulations currently being marketed.

SUMMARY OF THE INVENTION

This invention relates to a process for the preparation of storage-stable dye dispersions of alkali metal salts of anionic azo direct dyes comprising (a) preparing an aqueous slurry of an alkali metal salt of an azo direct dye, said salt having a solubility in water at 25° C. of about 0.1 to about 15% by weight, by azo coupling one or more aromatic diazonium salts with one or more couplers while maintaining a pH of at least about 5 (preferably pH 6 to 9) by adding a basic alkali metal compound (preferably an alkali metal hydroxide, carbonate, or bicarbonate) in the absence of a nitrogen-containing base;

(b) optionally, agitating the aqueous slurry at a temperature of about 5° C. to about 100° C. (preferably 50° C. to 90° C., more preferably 70° C. to 85° C.) for up to about six hours (preferably one to three hours);

(c) optionally, adjusting the temperature of the aqueous slurry to about 5° C. to about 40° C. (preferably about 20° C. to about 40° C.); and (d) adding to the aqueous slurry a viscosity enhancing agent (preferably an anionic polysaccharide, more preferably xanthan gum) in an amount sufficient to obtain a viscosity, determined at a temperature of about 20° to about 25° C., of about 500 to about 5000 centipoise (preferably 800 to 1500 centipoise) and 0 to about 10% by weight (preferably 2 to 5% by weight), based on the total weight of the dye dispersion, of a humectant, thereby forming the storage-stable dye dispersion.

DETAILED DESCRIPTION OF THE INVENTION

Suitable azo direct dyes are anionic dyes that contain one or more azo groups bound to two aromatic groups or to an aromatic group and an active methylene type coupler and which are substantive to cellulose. Typical azo direct dyes contain four to eleven (or, more typically, four to six) aromatic rings, including heteroaromatic rings, and one to six (or, more typically, one to three) sulfonic acid groups. Some of the aromatic or heteroaromatic rings can be incorporated in fused ring systems, such as naphthalene. The portion of the dye molecule that derives from the diazonium salt moiety used in the azo coupling procedure is typically less highly substituted than the portion of the dye that derives from the more electropositive coupler component. Typical coupler components are aromatic compounds, particularly naphthalene derivatives, substituted with hydroxy, amino, and sulfonic acid groups. Although less common, the coupler component can also be a β-diketo compound, such as acetoacetates or, preferably, acetoacetamides (for example, an acetoacetanilide), which couples through the active methylene group between the β-diketo carbonyl groups. Although one or more azo linkages must be present, the various aromatic moieties can also be bridged by other groups, such as urea or amide groups.

Preferred azo direct dyes are monoazo direct dyes in which a single azo group is connected to two aromatic groups and disazo direct dyes in which each of two azo groups is connected to two aromatic groups (one of which may, of course, be attached to both azo groups). Both the monoazo and disazo direct dyes have one or more sulfonic acid groups attached to at least one of the aromatic groups. Examples of suitable dyes include C.I. Direct Red 256, Direct Yellow 127, Direct Yellow 147, and Direct Blue 279. Other examples can be found, for example, in the *Colour Index*.

The alkali metal salts of the azo direct dyes are formed during the azo coupling procedure used to prepare the dyes. In a preferred method, a suitable aromatic amine is converted to the corresponding diazonium salt by known diazotization methods using an alkali metal nitrite salt (preferably sodium nitrite) in an aqueous mineral acid (preferably hydrochloric acid). The resultant diazonium salt can be isolated by filtration followed by washing to remove residual salts and acid or by other known methods, such as centrifugation, that allow removal of residual solvent, salts, and acid. It is also possible, although generally less preferred, to use the diazonium salt directly as prepared or in concentrated form obtained, for example, by membrane separation or decantation methods. Dilution of the diazonium salt is generally not suited to the preparation of dispersions according to the invention because of the resulting lower concentration of the final dispersion. The diazonium salt is coupled with a suitable aromatic compound (that is, a "coupler") in a slightly acidic to basic aqueous medium. In a particularly preferred embodiment, the diazonium salt filter cake is added to a slurry or solution of an approximately equimolar amount of the coupler (or, alternatively, the coupler is added to a slurry of the diazonium salt in water) and the resultant mixture is adjusted to and maintained at a pH of at least about 5 (preferably pH 6 to 9) by addition of a basic alkali metal compound (preferably an alkali metal hydroxide, carbonate, or bicarbonate, more preferably sodium or potassium hydroxide), thereby forming the alkali metal salt in situ. After the coupling reaction is complete, the resultant direct dye salts eventually form crystalline precipitates or gels. Although generally not necessary, it may sometimes be desirable to add additional quantities of base before carrying out step (b).

The coupling reaction is carried out in the absence of amine bases that are often used to obtain dye solutions. Example of amine bases to be avoided include tertiary amines such as $R^aR^bR^cN$, in which $R^a$, $R^b$, and $R^c$ are independently hydrogen, $C_1$–$C_6$ alkyl, or $C_2$–$C_6$ hydroxyalkyl, including, for example, triethylamine and triethanolamine.

Regardless of the specific preparative method used in step (a), the resultant direct dye salts typically have a solubility in water of about 0.1 to about 15% by weight (preferably 1 to 7% by weight) at 25° C. so that the salts can form a dispersion in the concentrated form but, preferably, can dissolve freely when diluted with water or a mixture of water with a water-miscible organic solvent. In general, salts having a solubility below the specified range would be too insoluble, even when prepared as a dispersion, to be useful as a dye, whereas it would not be necessary, or even possible, to form dispersions of salts having a greater solubility.

When carrying out the process of the present invention, the alkali metal salt of the azo direct dye is not isolated but is instead further processed in situ. Although it is possible to obtain a stable dispersion by directly treating the crystalline precipitate or gel form described above with the viscosity enhancing agent (that is, without adjusting the temperature and sometimes even without agitating the initially formed product of step (a)), it is generally necessary to agitate (preferably by stirring) the crystalline precipitate or gel before the viscosity enhancing agent is added (i.e., step (b)) at temperatures of up to about 100° C. (preferably 50° C. to 90° C., more preferably 70° C. to 85° C.) for up to about six hours (preferably one to three hours) to promote crystal conversion to give a more stable dispersion. If heated above 40° C., the slurry is generally cooled in optional step (c) to a temperature of about 5° C. to about 40° C. (preferably about 20° C. to about 40° C.) before the viscosity enhancing agent of the invention is added. Even if the slurry does not reach a temperature above 40° C. during step (a) or optional step (b), it may still be advantageous to change the temperature of the slurry to another temperature within the range specified in step (c) before adding the viscosity enhancing agent.

Suitable viscosity enhancing agents for use in step (d) of the invention are compounds that increase viscosity and thereby help stabilize the dispersion against settling. Examples of suitable viscosity enhancing agents include natural gums (such as guar gum, alginates, and gum arabic), anionic polysaccharides (such as sodium carboxymethylcellulose and xanthan gum), etherified cellulose, various heteropolysaccharides containing saccharide side chains (such as mannose and glucuronic acid), polyacrylamides and polymethacrylamides, and polyacrylates and polymethacrylates. Preferred viscosity enhancing agents include anionic polysaccharides, particularly xanthan gum (which is generally used as a 2 to 5% by weight aqueous solution).

The viscosity enhancing agent is used in an amount sufficient to provide the specified viscosities as determined at a temperature of about 20° to about 25° C. using methods known in the art, particularly the rotational method using a rotating spindle. Although viscosities ranging from 800 to 1500 centipoise are generally preferred, somewhat higher or lower viscosities are often acceptable. For the preferred xanthan gum, suitable viscosities can generally be obtained by using about 0.1 to about 0.5% by weight based on the total weight of the dye dispersion. Final color strength and viscosity adjustments, if needed, can generally be made by adding small quantities of water.

Humectants known for use with dyes are generally suitable. Examples of suitable humectants include various glycols, such as propylene glycol and glycerin, glycol ethers, polyglycols, polyglycol ethers, and formamide. If used at all, the quantity of humectant normally ranges up to about 10% by weight (preferably 2 to 5% by weight), based on the total weight of the dye dispersion.

Other additives known in the art can also be included. For example, it is generally advantageous to include biocides to inhibit or suppress mold or bacterial growth. Examples of suitable biocides include potassium sorbate, sodium pentachlorophenolate, 2,6-dimethyl-1,3-dioxan-4-ol acetate, 1,2-benzisothiazol-3(2H)-one, and condensation products of aromatic alcohols and paraformaldehyde (particularly benzyl alcohol and aqueous formaldehyde). Biocides, if used at all, can typically be used in amounts of up to 3% by weight (preferably from 0.05 to 0.5% by weight).

it is also often advantageous to include known defoamers, particularly in coupling step (a). Examples of suitable defoamers include tributyl phosphate, reaction products of an alkyl succinic acid anhydride and aliphatic alcohols, siloxanes, and water-immiscible organic liquids (such as mineral oil, chlorinated mineral oil, and the like).

It is possible to include known corrosion inhibitors, preferably after coupling step (a) is complete. Examples of suitable corrosion inhibitors include benzotriazole, tolyltriazole, and dicyclohexyl ammonium nitrate.

It is also possible to include known dispersants, such as those disclosed in U.S. Pat. Nos. 3,770,371, 4,110,073, 4,468,230, and 4,673,410. Suitable dispersants include compounds in which one part of the molecular structure is hydrophilic (for example, anionic groups such as sulfonate or carboxylate groups) and another part of the molecular structure is hydrophobic and include sulfonated condensation products of naphthalene and formaldehyde; lignin sulfonates; alkyl sulfonates; sulfonates of polycarboxylic acid esters; alkyl benzenesulfonates; sulfonated aliphatic alcohols; sulfuric acid monoesters of condensation products of ethylene oxide with amines, fatty acids, phenols, or alcohols. Examples of suitable anionic dispersants include sodium dodecylsulfonate, sodium lauryl sulfate, sodium dodecylbenzenesulfonate, dibutyl naphthalene sulfonate, sodium dioctyl sulfosuccinate, sulfuric acid monoesters of the condensation products of ethylene oxide with nonylphenol, condensation products of cresol, sodium bisulfite, and formaldehyde, condensation products of 2-hydroxynaphthalene-6-sulfonic acid and formaldehyde, sulfonic acids of the condensation products of naphthalene, terphenyl, or ditolyl ether with formaldehyde, and condensation products of cyclohexanone, sodium bisulfite, and formaldehyde. In general, the sodium or ammonium salts are preferred.

Although generally not preferred, it is possible to include additional electrolytes to the dispersions of the invention. Examples of suitable electrolytes include sodium chloride and sodium sulfate.

Dispersions prepared according to the present invention typically contain about 10 to about 20% by weight (preferably 12 to 15% by weight, more preferably about 12% by weight), based on the total weight of the dispersion, of the dye component.

Dispersions prepared according to the present invention are stable in the sense that they do not precipitate upon standing, even for extended periods of time.

The dye dispersions of the present invention can be used to dye a variety of substrates but are particularly useful for dyeing and printing paper, paperboard, and cardboard, as well as other cellulosics. The dye dispersions are preferably used directly without being diluted. However, it is also possible to dilute the dispersions before use, thereby forming at least partly dissolved dye mixtures that are useful, for example, for continuous coloring, such as trim applications.

Particularly suitable substrates include, for example, bleached, sized, or unsized lignin-free paper, for which the starting material can be bleached, unbleached or semi-bleached pulps, and recycled and deinked fibers. Other cellulosic fibers, such as cotton, can also be colored by the dye dispersions of the present invention. The dye dispersions can be applied by any of several methods known in the art, including application to a pulp in water suspension, surface dyeing, coating, and printing.

Application to pulp in a water suspension (also called "internal dyeing") can be performed by batch addition to a beater or "hydrapulper", which generally provides excellent agitation. Batch addition is performed by weighing or volumetrically measuring the dye into the pulp containing vessel. The dye dispersions of the present invention can also be added continuously to a flow of pulp in water by means of a metering device such as a gear or piston type pump. The dyes can be added in either undiluted or diluted form depending on the depth of shade desired and the type of metering device used.

Surface dyeing can be performed, for example, on a paper machine with a set of rollers known as a "size press." These rolls form a nip with the sheet of paper traveling between them. A pond of aqueous size press liquor, which generally contains starch and other additives as well as the dyes, is metered to both sides of the sheet. The liquor is absorbed into the surface of the sheet, thus imparting a color to the sheet. Surface coloring is often used in combination with internal dyeing techniques.

Coating coloring can be applied by any of several methods on-line to or off-line from a paper machine. Coating slurries typically comprise a pigmented filler (such as clay or titanium dioxide), a latex binder, a colorant (such as a dye dispersion according to the present invention), and other known additives to enhance the coating performance. The coating mixture is typically applied to the sheet, generally using a roller covered with the coating mixture, and the excess is scraped off with a blade.

Printing can be carried out using any of several known methods to obtain decorative designs or mass surface coverage. Dye dispersions of the present invention, for example, can be mixed with other additives, such as binders and lubricants, and applied to a sheet surface using any of several known printing techniques, such as flexographic printing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Viscosities of the dispersions formed in the following Examples were determined at a temperature of about 20° to about 25° C. using a Brookfied Viscometer model LTV equipped with a number 3 spindle rotating at 12 rpm. The viscosity in centipoise (cp) of each sample was determined by multiplying the instrument reading after twelve revolutions by 100.

Example 1

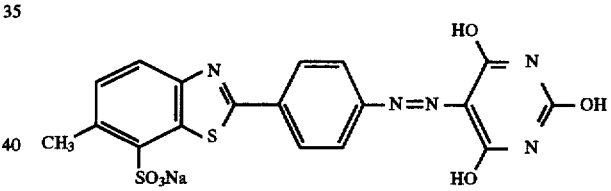

To a stirred slurry of 46.4 g (144 mmoles) of 2-(4-aminophenyl)-6-methyl-7-benzothiazolesulfonic acid (also known as dehydrothio-p-toluidinesulfonic acid or "DHTPTSA") in 264 ml of water was added 12.8 g (160 mmole) of 50% aqueous sodium hydroxide. The mixture was stirred at 40° C. for 15 minutes, after which was added 25.5 g (148 mmole) of 40% aqueous sodium nitrite in one portion. The resultant mixture was added over a period of two hours to a mixture of 1 g of 40% aqueous sodium nitrite in 43.9 g (378 mmole) of hydrochloric acid (20° Bé) diluted with about 117 ml of water at 40° C. The diazotization mixture was stirred for an additional two hours, with small portions of sodium nitrite being added as needed to maintain the presence of nitrous acid, after which the reaction was quenched with about 0.2 g of sulfamic acid. The diazonium salt of DHTPTSA that precipitated was collected by filtration and washed with 150 ml of water adjusted to pH 3.5 with hydrochloric acid. The diazonium salt was then stirred with about 125 ml of water to form a slurry having a pH of about 4.0. To the diazonium salt slurry was added, with stirring, 18.6 g (145 mmole) of barbituric acid to form a slurry having a pH of about 2.0. To this slurry was then added 10% aqueous sodium hydroxide (about 60 ml) to maintain a pH of about 5.0 to 5.5. The slurry was then adjusted to pH 7.0 using about 6 ml of 10% aqueous sodium hydroxide and gradually heated to 80° C. over a period of one hour. The mixture was allowed to cool to ambient temperature and stirred for two hours. To the resultant slurry was added, with stirring, 40.0 g of a 2.5% aqueous solution of xanthan gum (available as Keltrol from Kelco) and 12.0 g of glycerin. The mixture was stirred rapidly for two hours, after which was added 1.2 g of Giv-Gard DXN (a preservative containing 2,6-dimethyl-1,3-dioxan-4-ol acetate and available from Givaudan Corp.) and 0.8 g of Proxel GXL (a preservative containing 1,2-benzisothiazol-3(2H)-one and available from ICI Americas). The mixture was diluted to about 475 ml with water to form a dispersion containing 13.9% of the monosodium salt of 2-[4-[(hexahydro-2,4,6-trioxo-5-pyrimidinyl)azo]phenyl]-6-methyl-7-benzothiazolesulfonic acid (solubility of 1.2 g/100 g of water), as well as about 0.2% sodium chloride, having a viscosity of 800 to 1200 cp and a $\lambda_{max}$ of 413 nm.

Example 2

To a stirred slurry of 75 g (20.3 mmoles) of 4,4'-diaminostilbene-2,2'-disulfonic acid (also known as flavonic acid) in 470 ml of water was added 31.3 g (39 mmole) of 50% aqueous sodium hydroxide. To the resultant dark brown solution was added 120 g (105 mmole) of hydrochloric acid (20° Bé) with high speed agitation over a period of two hours. After the temperature of the resultant slurry was adjusted to 30° C., 72.3 g (41.9 mmole) of 40% aqueous sodium nitrite was added over a period of four hours. The diazotization mixture was stirred at about 33° C. for an additional 1.5 hours, with small portions of sodium nitrite being added as needed to maintain the presence of nitrous acid, after which the reaction was then quenched with about 0.6 g of sulfamic acid. The diazonium salt that precipitated was collected by filtration. To a slurry of 129 g (40 mmole) of 4-hydroxy-5-aminonaphthalene-2,7-disulfonic acid ("H acid") in 400 ml of water was added 36.4 g (45.5 mmole) of 50% aqueous sodium hydroxide to dissolve the H acid and adjust the resultant solution to pH 8.0. The diazonium salt was added over a period of 30 minutes, during which time

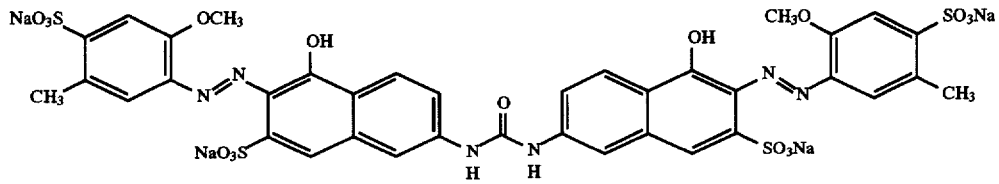

30

To a solution of 0.735 mole of p-cresidine-o-sulfonic acid dissolved in 1000 ml of 1M sodium hydroxide was added 174 ml (1.03 equiv.) of an aqueous 4.35M solution (0.300 g/ml) of sodium nitrite. The resultant fine suspension was introduced over a period of 30 minutes at room temperature to a stirred mixture of 190 ml (2.5 equiv.) of 30% hydrochloric acid and 1 ml of an aqueous 4.35M solution of sodium nitride in 200 ml of water. After 30 minutes a small amount of sulfamic acid was added to destroy the excess nitrous acid. The resultant diazonium salt solution was then added over a period of 30 minutes to a stirred solution of 202 g (0.368 equiv.) of 7,7'-(carbonyldiimino)bis[4-hydroxy-2-naphthalenesulfonic acid]("J-acid urea") in 800 ml of water to which portions of 10% sodium hydroxide were added to maintain a pH of 6.0, thereby giving a dark red, easily stirred slurry. Additional 10% sodium hydroxide was added to bring the pH to 7.0. The slurry was then treated with 280 g of 2.5% aqueous xanthan gum, 75 g of glycerin as humectant, and 7.6 g of Giv-Gard DXN and 5.0 g of Proxel GXL as preservatives to form a dispersion containing about 12.3% of the tetrasodium salt of 7,7'-(carbonyldiimino)bis[4-hydroxy-3-[(2-methoxy-5-methyl-4-sulfophenyl)azo]-2-naphthalenesulfonic acid](solubility of about 2.6 g/100 g of water), as well as about 2.3% sodium chloride, having a viscosity of about 1000 cp and a $\lambda_{max}$ of 503 nm.

Example 3 a pH of about 7.5 to 8.0 was maintained by adding portions of aqueous sodium hydroxide and a temperature of 25° to 30° C. was maintained by addition of ice as needed. The reaction mixture was heated at 80° C. for three hours, cooled to less than 35° C. with about 75 g of ice, and treated with 1 g of Giv-Gard DXN. The dyestuff dispersion was diluted with 160 g of water, 12.7 g of 4.7% aqueous xanthan gum, and 54 g of glycerin to form a dispersion containing about 21% of the hexasodium salt of 3,3'-[1-ethenediylbis[(3-sulfo-4,1-phenylene)azo]]bis[5-amino-4-hydroxy-2,7-naphthalenedisulfonic acid](solubility of 13.5 g/100 g of water) having a viscosity of about 1230 cp and a $\lambda_{max}$ of 582 nm.

Example 4

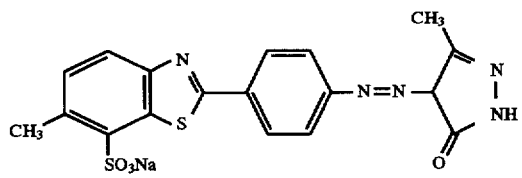

To a stirred slurry of 92.7 g (289 mmoles) of DHTPTSA in 533 ml of water was added 25 g (313 mmole) of 50% aqueous sodium hydroxide. The resultant solution was

heated to 40° C., after which was added 53 g (307 mmole) of 40% aqueous sodium nitrite in one portion. The resultant mixture was added over a period of two hours at 40° C. to a mixture of 1 g of 40% aqueous sodium nitrite in 80 g (about 680 mole) of hydrochloric acid (20° Bé) diluted with about 67 ml of water. The diazotization mixture was stirred for an additional two hours, with small portions of sodium nitrite being added as needed to maintain the nitrous acid, after which the reaction was quenched with about 0.2 g of sulfamic acid. The resultant precipitate was collected by filtration and washed with water until neutral. The resultant diazonium salt of DHTPTSA was stirred with about 450 ml of water to form a slurry, to which was then added, with stirring, 13.3 g of glycerin and 28.5 g (290 mmole) of 3-methyl-5-pyrazolone. To this reaction mixture was added 50% aqueous sodium hydroxide (about 112 g) to maintain a pH of about 6. The solution obtained after coupling was complete was heated at 70° to 75° C., during which time the dyestuff precipitated to form a thick slurry. (Foaming could be controlled by adding a defoamer.) After three hours, the mixture was allowed to cool to ambient temperature. To the resultant fluid slurry (which had a relative color strength of 112% and a viscosity of 260 cp) was added, with stirring, 45 g of a 4.7% aqueous solution of xanthan gum, 0.18 g of Giv-Gard DXN, and 0.04 g of Proxel GXL. The mixture was diluted with about 220 ml with water to form a dispersion containing about 12% of the monosodium salt of 2-[4-[(4, 5-dihydro-3-methyl-5-oxo-1H-pyrazol-4-yl)-azo]phenyl]-6-methyl-7-benzothiazolesulfonic acid having a viscosity of about 1800 cp, a $\lambda_{max}$ of 444 nm, and a spectroscopic color strength of about 98% relative to a corresponding dye solution of Direct Yellow 127 available as PONTAMINE Golden Yellow RB Liquid from Bayer Corporation.

Performance Parameters

Performance parameters were obtained for the dye dispersions of Examples 1–3 using acid and alkaline dyeings (for coloristic properties, bleachability, and substantivity) and dilute aqueous solutions (for foaming propensity and dilute stability).

Acid dyeings

Pulp mixtures were prepared by stirring 3 g (dry weight) of bleached, softwood kraft pulp in 100 ml of water artificially hardened to 200 ppm with calcium chloride. To the pulp slurry was added 1.0% (based on the dry weight of fiber) of an appropriate standard dye or an equivalent amount (as determined by the transmission spectral method described below) of a test dye dispersion. The dyed pulp mixture was stirred for two minutes, after which was added 4.0 ml of a 0.88% solution of Pexol rosin size solution. After the slurry was stirred for an additional five minutes, 10.0 ml of a 1.5% aluminum sulfate solution was added to the slurry. The dyed pulp mixture was stirred for twenty minutes, then further diluted with 100 ml of artificially hardened water and poured into a TAPPI sheet mold half filled with deionized water. A paper sheet was formed as the water was drained from the mold through the forming screen located at the bottom of the TAPPI mold. The resultant sheet was pressed between blotters, placed on a chrome backing plate, and placed in a drying ring for drying in an oven at approximately 90° C. The dried sheets are then compared for color strength and shade difference.

Alkaline dyeings

Pulp mixtures were prepared by stirring 3 g (dry weight) of bleached, softwood kraft pulp in 100 ml of water artificially hardened to 200 ppm with calcium chloride. A 3% calcium carbonate suspension (10 ml) was added to the pulp mixture, which was then allowed to mix for five minutes. To this pulp slurry was added 1.0% (based on the dry weight of fiber) of an appropriate standard dye or an equivalent amount (as determined by the transmission spectral method described below) of a test dye dispersion. The dyed pulp slurry was stirred for fifteen minutes, after which 2 ml of a 0.3% solution of alkyl ketene dimer sizing agent (available as Hercon 70 from Hercules) were added to the pulp mixture. After the mixture stirred for an additional five minutes, the slurry was further diluted with 100 ml of hardened water, stirred for an additional two minutes, and poured into a TAPPI sheet mold half filled with deionized water. A paper sheet was formed as the water was drained from the mold through the forming screen located at the bottom of the TAPPI mold. The resultant sheet was pressed between blotters, placed on a chrome backing plate, and placed in a drying ring for drying in an oven at approximately 90° C. The dried sheets were then compared for color strength and shade difference.

Performance parameters for the dye dispersions prepared according to Examples 1–3 were determined using the following standards in solution form:

Standard A: C.I. Direct Yellow 147 (available as PONTAMINE Bond Yellow 303 Liquid from Bayer Corporation)

Standard B: C.I. Direct Red 256 (laboratory prepared solution)

Standard C: C.I. Direct Blue 279 (available as PONTAMINE Blue SPN Liquid from Bayer Corporation)

The relative color strengths of the dye dispersions of Examples 1–3 and the standard dyes were used to compare their color properties. In particular, the relative absorbances at the absorption maximum ($\lambda_{max}$) of each dye dispersion and standard were compared to determine the relative amounts of each dye dispersion and corresponding standard that should be applied to the paper samples to obtain dyed samples having similar reflectance strengths.

Sample sheets of dyed bleached kraft paper were prepared as described above using 1% solutions of appropriate dye standards and the indicated amounts of the dye dispersions of Examples 1–3 (for which the quantities were adjusted as described above to account for the difference in relative light absorbances of the dye mixtures). The dyed paper sheets were compared to determine reflectance color strengths (by visual evaluation and instrument measurements), shade (by visual evaluation and instrument measurements), bleachability, and substantivity using the methods described below.

Reflectance color strength a. Visual. The dyed sheets were viewed under a standard light source (MacBeth light booth equipped with a D65 light source). The observed strength of each test dye dispersion is reported relative to a standard (listed in each table as parts).

b. Instrument. The dyed sheets were analyzed using a color measuring device (Data Color Systems, ACS model CS-5). The instrument measures the absorbance at $\lambda_{max}$ for each sheet and (using the Kubelka-Munk K/S equation) automatically calculates the difference in color strength between sheets dyed with a test dye dispersion and those dyed with a standard. The results are reported in each table as parts.

Shade a. Visual. The dyed sheets were examined visually under the same conditions as described above for visual color strength. Any difference in shade is reported using standard coloristic difference terms used to describe shade and brightness/dullness. The difference terms are based on the AATCC Gray Scale and are reported as follows:

| Yellow dyes | |
|---|---|
| Trace red | Trace green |
| Slight red | Slight green |
| Distinct red | Distinct green |
| Considerable red | Considerable green |
| Much red | Much green |
| Off-shade red | Off-shade green |

| Blue dyes | |
|---|---|
| Trace red | Trace green |
| Slight red | Slight green |
| Distinct red | Distinct green |
| Considerable red | Considerable green |
| Much red | Much green |
| Off-shade red | Off-shade green |

| Red dyes | |
|---|---|
| Trace yellow | Trace blue |
| Slight yellow | Slight blue |
| Distinct yellow | Distinct blue |
| Considerable yellow | Considerable blue |
| Much yellow | Much blue |
| Off-shade yellow | Off-shade blue |

Similar descriptive terms are applied to brightness and dullness.

b. Instrument. The color measuring device described above for reflectance color strength provided color readings in the CIE CMC(2:1) system for dyed paper sheets. In the CIE CMC(2:1) system, the term L* refers to lightness, for which a higher value is a lighter color and a lower value is a darker color; the term C* refers to chroma, an indication of the color saturation; and H* refers to hue. Results are reported in terms of the difference (i.e., delta values) between the corresponding L*, C*, and H* values of sheets dyed with the test dye dispersions and with corresponding values of the standards.

Bleachability.

Bleaching tests were used to determine the amount of color removed from dyed paper using sodium hypochlorite. For each test, sample sheets were re-pulped by blending vigorously in water. The pulp was collected on a screen and suspended in a container using sufficient water to form a 4% suspension of pulp. Separate samples were treated at 60° C. for 30 minutes with 4% sodium hypochlorite (or the equivalent required to provide 2% available chlorine) at about pH 10. The bleached pulp samples were then poured into a TAPPI sheet mold half filled with deionized water. The paper sheet that formed as the water drained from the mold through the forming screen located at the bottom of the sheet mold was pressed between blotters and dried at about 93° C. on an electric drum-type dryer. The resultant dyed sheets were compared to unbleached paper sheets for color strength. Samples having less color remaining are considered more bleachable. Results are reported in the tables as percent color remaining relative to the dyed, unbleached samples.

Substantivity

Substantivity was measured for each dye dispersion and an appropriate standard dye solution during the acid dyeing procedure. As the paper sheet was forming in the TAPPI mold, a small portion of the effluent water from the mold was placed in a clear glass container. The containers for each test sample and for the corresponding standard were placed next to each other in front of a sheet of white blotter paper. The relative color strengths were compared visually and rated using the same scales as described above (i.e., trace, slightly, distinctly, considerably, or much more or less color strength or equal color strength). An effluent water sample containing more color indicates that a dye is less substantive to the fiber.

Foaming propensities and dilute stabilities of the dye dispersions of Examples 1-3 and the standard dyes were obtained by the following methods.

Foaming propensity

A 2.5 g sample of each dye dispersion and an appropriate standard dye solution were diluted to about 500 ml with deionized water in a blender cup. The test solutions were mixed at high speed for 60 seconds in a Waring blender. The foam height was measured immediately upon stopping the blender and after one minute.

Dilute stability

Samples of each dye dispersion and an appropriate standard dye solution were separately mixed with about 200 to about 500 ml of deionized water at about 25° C. to a concentration of about 0.3%. The containers were covered to avoid evaporation and allowed to stand at about 20° C. The resultant solutions were observed for evidence of precipitation or cloudiness after a given period of time. A rating of "equal" indicates no precipitation of the test solution.

Performance parameters for the dye dispersion of Example 1 are summarized in Tables 1a and 1b, performance parameters for the dye dispersion of Example 2 are summarized in Tables 2a and 2b, and performance parameters for the dye dispersion of Example 3 are summarized in Tables 3a and 3b.

TABLE 1a

Test results for acid and alkaline dyeings based on Example 1

| | Acid Dyeings | | Alkaline Dyeings | |
|---|---|---|---|---|
| | Standard A | Example 1 | Standard A | Example 1 |
| Dye | | | | |
| Dye strength (parts) | 100 | 125 | 100 | 125 |
| Dye amount (%) Visual | 1.0 | 1.2 | 1.0 | 1.2 |
| Strength (parts) | 100 | 100 | 100 | 100 |
| Shade | — | equal | — | equal |
| Substantivity Reflectance | — | equal | — | — |
| Strength (parts) Shade (CMC(2:1)) | 100.0 | 98.9 | 100.0 | 101.7 |
| ΔL* | — | −0.01 | — | −0.01 |
| ΔC* | — | +0.10 | — | −0.10 |
| ΔH* | — | 0.00 | — | −0.05 |
| Bleachability (% color remaining) | 2.2 | 2.3 | — | — |

TABLE 1b

Physical properties for the dye dispersion of Example 1

| | Standard A | Example 1 |
|---|---|---|
| Foaming propensity | | |
| Initial foam (mm) | 1 | 3 |
| After 60 sec. (mm) | 1 | 3 |
| Dilute stability | clear | >6 days (slightly cloudy) |

TABLE 2a

Test results for acid and alkaline dyeings based on Example 2

| | Acid Dyeings | | Alkaline Dyeings | |
|---|---|---|---|---|
| | Standard B | Example 2 | Standard B | Example 2 |
| Dye | | | | |
| Dye strength (parts) | 100 | 155 | 100 | 155 |
| Dye amount (%) | 1.0 | 1.6 | 1.0 | 1.6 |
| Visual | | | | |
| Strength (parts) | 100 | 97 | 100 | 100 |
| Shade | — | slight blue, trace dull | — | slight blue |
| Substantivity | — | equal | — | — |
| Reflectance | | | | |
| Strength (parts) | 100.0 | 98.4 | 100.0 | 99.2 |
| Shade (CMC(2:1)) | | | | |
| $\Delta L^*$ | — | −0.24 | — | −0.11 |
| $\Delta C^*$ | — | −0.05 | — | −0.02 |
| $\Delta H^*$ | — | −0.69 | — | −0.30 |
| Bleachability (% color remaining) | 9.1 | 6.2 | — | — |

TABLE 2b

Physical properties for the dye dispersion of Example 2

| | Standard B | Example 2 |
|---|---|---|
| Foaming propensity | | |
| Initial foam (mm) | <1 | <1 |
| After 60 sec. (mm) | <1 | <1 |
| Dilute stability | clear | equal |

TABLE 3a

Test results for acid and alkaline dyeings based on Example 3

| | Acid Dyeings | | Alkaline Dyeings | |
|---|---|---|---|---|
| | Standard C | Example 3 | Standard C | Example 3 |
| Dye | | | | |
| Dye strength (parts) | 100 | 186 | 100 | 186 |
| Dye amount (%) | 1.0 | 9.3 | 1.0 | 9.3 |
| Visual | | | | |
| Strength (parts) | 100 | 100 | 100 | 100 |
| Shade | — | slight red to distinct red | — | slight red |
| Substantivity | — | equal | — | — |
| Reflectance | | | | |
| Strength (parts) | 100.0 | 99.1 | 100.0 | 99.1 |
| Shade (CMC(2:1)) | | | | |
| $\Delta L^*$ | — | −0.13 | — | −0.08 |
| $\Delta C^*$ | — | +0.03 | — | 0.00 |
| $\Delta H^*$ | — | +0.81 | — | +0.35 |
| Bleachability (% color remaining) | 0.9 | 0.7 | — | — |

TABLE 3b

Physical properties for the dye dispersion of Example 3

| | Standard C | Example 3 |
|---|---|---|
| Foaming propensity | | |
| Initial foam (mm) | <1 | 1 |
| After 60 sec.(mm) | <1 | 1 |
| Dilute stability | clear | equal |

What is claimed is:

1. A process for the preparation of storage-stable dye dispersions of alkali metal salts of anionic azo direct dyes comprising (a) preparing an aqueous slurry of an alkali metal salt of an azo direct dye, said salt having a solubility in water at 25° C. of about 0.1 to about 15% by weight, by azo coupling one or more aromatic diazonium salts with one or more couplers while maintaining a pH of at least about 5 by adding a basic alkali metal compound in the absence of a nitrogen-containing base;

(b) optionally agitating the aqueous slurry at a temperature of 5° C. to 100° C. for up to about six hours;

(c) optionally, adjusting the temperature of thee aqueous slurry to 5° C. to 40° C.; and (d) adding directly to the aqueous slurry, without first isolating the dyes a viscosity enhancing agent in an amount sufficient to obtain a viscosity, determined at a temperature of about 20° to about 25° C., of 500 to 5000 centipoise and 0 to 10% by weight, based on the total weight of the dye dispersion, of a humectant, thereby forming the storage-stable dye dispersion.

2. A process according to claim 1 wherein the coupler is an aromatic coupler.

3. A process according to claim 1 wherein the azo coupling is carried out at a pH of 6 to 9.

4. A process according to claim 1 wherein the basic alkali metal compound is an alkali metal hydroxide, carbonate, or bicarbonate.

5. A process according to claim 1 wherein the basic alkali metal compound is sodium or potassium hydroxide.

6. A process according to claim 1 wherein the aqueous slurry is agitated in step (b) at a temperature of 50° C. to 90° C. for one to three hours.

7. A process according to claim 1 wherein in step (c) the temperature of the aqueous slurry is adjusted to 20° C. to 40° C.

8. A process according to claim 1 wherein the viscosity enhancing agent is an anionic polysaccharide.

9. A process according to claim 1 wherein the viscosity enhancing agent is xanthan gum.

10. A process according to claim 1 wherein the viscosity enhancing agent is added in an amount sufficient to obtain a dye dispersion having a viscosity, determined at a temperature of about 20° to about 25° C., of 800 to 1500 centipoise.

11. A process according to claim 1 wherein 2 to 5% by weight, based on the total weight of the dye dispersion, of a humectant is added in step (b).

12. A process according to claim 1 additionally comprising adding a biocide, a defoamer, a corrosion inhibitor, a dispersant or a mixture thereof.

13. A process according to claim 1 wherein the anionic azo direct dye is a monoazo or disazo direct dye.

14. A process according to claim 1 wherein the anionic azo direct dye is selected from the group consisting of compounds having the formulas

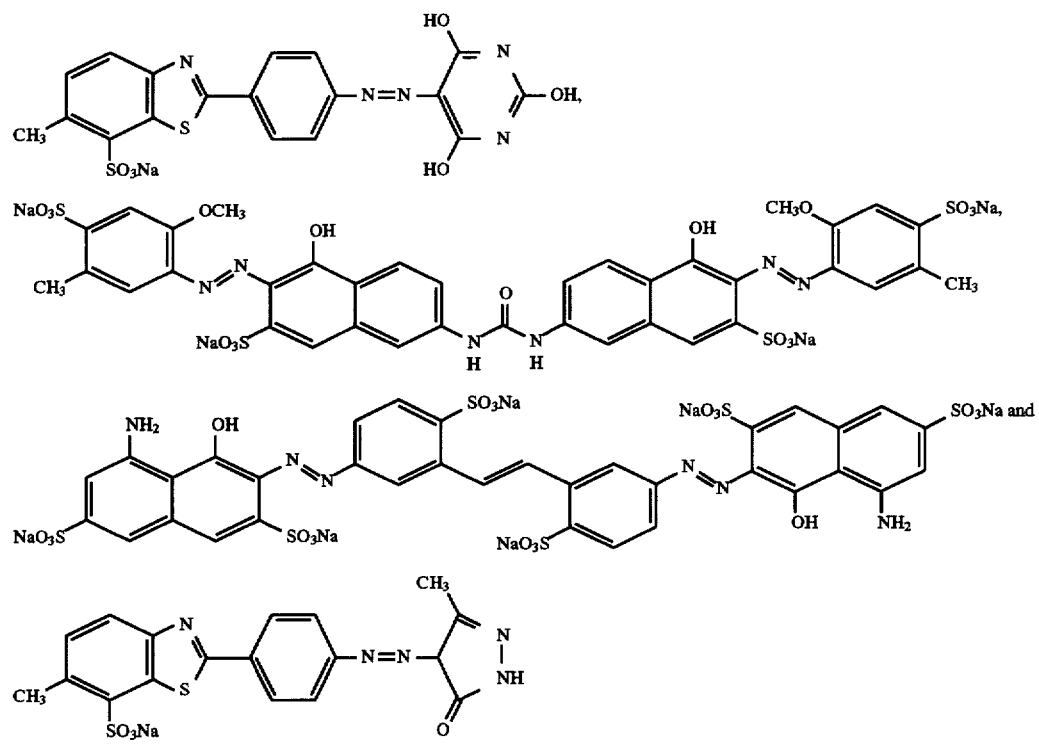
* * * * *